US012668326B2

(12) United States Patent
Chen et al.

(10) Patent No.: US 12,668,326 B2
(45) Date of Patent: Jun. 30, 2026

(54) HUB MOTOR

(71) Applicant: TIEN HSIN INDUSTRIES CO., LTD., Taichung City (TW)

(72) Inventors: Chun-Wei Chen, Taichung City (TW); Chang-Chun Kao, Taichung City (TW); Chien-Mo Lu, Taichung City (TW); Chin-Wen Ou, Taichung City (TW); Yu-Chen Wu, Taichung City (TW); Ming-Lan Ou, Taichung City (TW)

(73) Assignee: TIEN HSIN INDUSTRIES CO., LTD., Taichung City (TW)

( * ) Notice: Subject to any disclaimer, the term of this patent is extended or adjusted under 35 U.S.C. 154(b) by 399 days.

(21) Appl. No.: 18/369,218

(22) Filed: Sep. 18, 2023

(65) Prior Publication Data

US 2025/0091692 A1 Mar. 20, 2025

(51) Int. Cl.
*B62M 6/65* (2010.01)
*B60K 7/00* (2006.01)
(52) U.S. Cl.
CPC ............. *B62M 6/65* (2013.01); *B60K 7/0007* (2013.01); *B60K 2007/0092* (2013.01)

(58) Field of Classification Search
CPC ................... B62M 6/65; B60K 7/0007; B60K 2007/0092; F16H 1/46
See application file for complete search history.

(56) References Cited

U.S. PATENT DOCUMENTS

| 9,638,285 B2 * | 5/2017 | Huang ................... H02K 7/116 |
| 2019/0305638 A1 * | 10/2019 | Chi-Hsueh .......... B60L 15/2045 |
| 2023/0278665 A1 * | 9/2023 | Lu .......................... H02K 7/003 |
| | | 180/65.51 |

* cited by examiner

*Primary Examiner* — Jason D Shanske
*Assistant Examiner* — Al-Birr Rahman Chowdhury

(57) ABSTRACT

A hub motor includes an axle, a stator, a rotor, a casing, a sleeve, and a mounting seat. The axle has a first end, a second end, and a bump protruding out of a radial-outer-side surface of the axle. The bump is located on a side close to the second end in the extension direction. The stator is fixed to the axle and is close to the first end. The rotor is sleeved on the axle and pivots around the stator with the axle as an axis. The casing is sleeved on the axle, is driven by the rotor to pivot with the axle serving as an axis, and accommodates the stator and the rotor. The sleeve is rotatably sleeved on the second end of the axle and is connected to the casing. The mounting seat is connected to the axle and sleeved on the bump.

10 Claims, 7 Drawing Sheets

22

HUB MOTOR

FIELD OF THE INVENTION

The present disclosure relates to a motor, and more particularly to a hub motor mounted on a bicycle.

BACKGROUND OF THE INVENTION

A hub motor is a motor that drives a casing to rotate by means of an internal mechanism. When being applied to a bicycle, the hub motor is mounted on the front wheel or a rear wheel of the bicycle, and the casing of the hub motor is connected to the front wheel or the rear wheel. Thus, the hub motor can serve as an auxiliary power of the bicycle to drive the wheels to rotate.

In order to well control and monitor the hub motor, it is inevitable to mount a sensor on the hub motor, and how to improve the sensing accuracy of the sensor and avoid the influence of an external environment is a great challenge.

SUMMARY OF THE INVENTION

The present disclosure provides a hub motor, and a sensing unit therein has the advantage of quickness and accuracy in mounting and has relatively high sensing accuracy.

In order to achieve the above-mentioned advantages, an embodiment of the present disclosure provides a hub motor adapted to be mounted on a bicycle. The hub motor includes an axle, a stator, a rotor, a casing, a sleeve, and a mounting seat. The axle is fixed to a frame of the bicycle and has a first end, a second end opposite each other in an extension direction, and a bump protruding out of a radial-outer-side surface of the axle in a radial direction of the axle. The bump is located on a side close to the second end in the extension direction. The stator is fixed to the axle and is close to the first end. The rotor is sleeved on the axle and pivots around the stator with the axle serving as an axis. The casing is sleeved on the axle, is driven by the rotor to be capable of pivoting with the axle serving as an axis, and has an accommodating space. The accommodating space accommodates the stator and the rotor. The sleeve is rotatably sleeved on the second end of the axle and is fixedly connected to the casing. The mounting seat is connected to the axle and sleeved on the bump, can slide in the extension direction but cannot rotate in a circumferential direction of the axle, is adjacent to the sleeve, and has a sensing unit facing the sleeve.

In an embodiment, the mounting seat has a disc body. The disc body has a central opening. A contour of the central opening corresponds to shapes of the axle and the bump.

In an embodiment, a first convex ring extending towards the sleeve in the extension direction is formed at a periphery of the central opening, and the first convex ring has an alignment groove corresponding to the bump in position and facing the radial direction.

In an embodiment, a second convex ring extending towards the sleeve in the extension direction is formed at an outer periphery of the disc body. The second convex ring, the disc body, the axle, and the sleeve jointly form a first arrangement space located on one side of the sleeve. The sensing unit is located in the first arrangement space.

In an embodiment, the sleeve has a third convex ring extending towards the first end in the extension direction. The second convex ring has a first buckle ring located on a radial-inner-side surface of the second convex ring. The first buckle ring is rotatably snap-fitted with the third convex ring.

In an embodiment, an inner diameter of the third convex ring gradually shrinks from the second end to the first end. A second arrangement space is enclosed by a radial-inner-side surface of the third convex ring. A base plate facing the sensing unit is arranged in the second arrangement space.

In an embodiment, the third convex ring has an opening facing the mounting seat, and the base plate has a size greater than that of the opening.

In an embodiment, an inner diameter of the third convex ring gradually shrinks from the second end to the first end. A second buckle ring is arranged on an outer surface of the third convex ring. The second buckle ring is slidably snap-fitted with the first buckle ring.

In an embodiment, the radial-outer-side surface of the axle has a wiring channel facing the radial direction and extending in the extension direction, and the mounting seat has a wiring opening corresponding to the wiring channel in position.

In an embodiment, the radial-outer-side surface of the axle has a limiting block extending in the radial direction, and the limiting block is adjacent to the bump.

According to the above description, with regard to the hub motor of the present disclosure, the sensing unit is mounted on the mounting seat fixed to the axle, and the mounting seat is snap-fitted with the axle by means of the bump of the axle so that the hub motor has the advantage of quickness in assembly and positioning. The mounting seat is away from the stator and the rotor, so that the sensing unit on the mounting seat may have a relatively high accuracy due to the fact that the influence caused by electromagnetic fields of the stator and the rotor is reduced due to the fact that the sensing unit is away from the stator and the rotor.

Other objectives, features, and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1A:
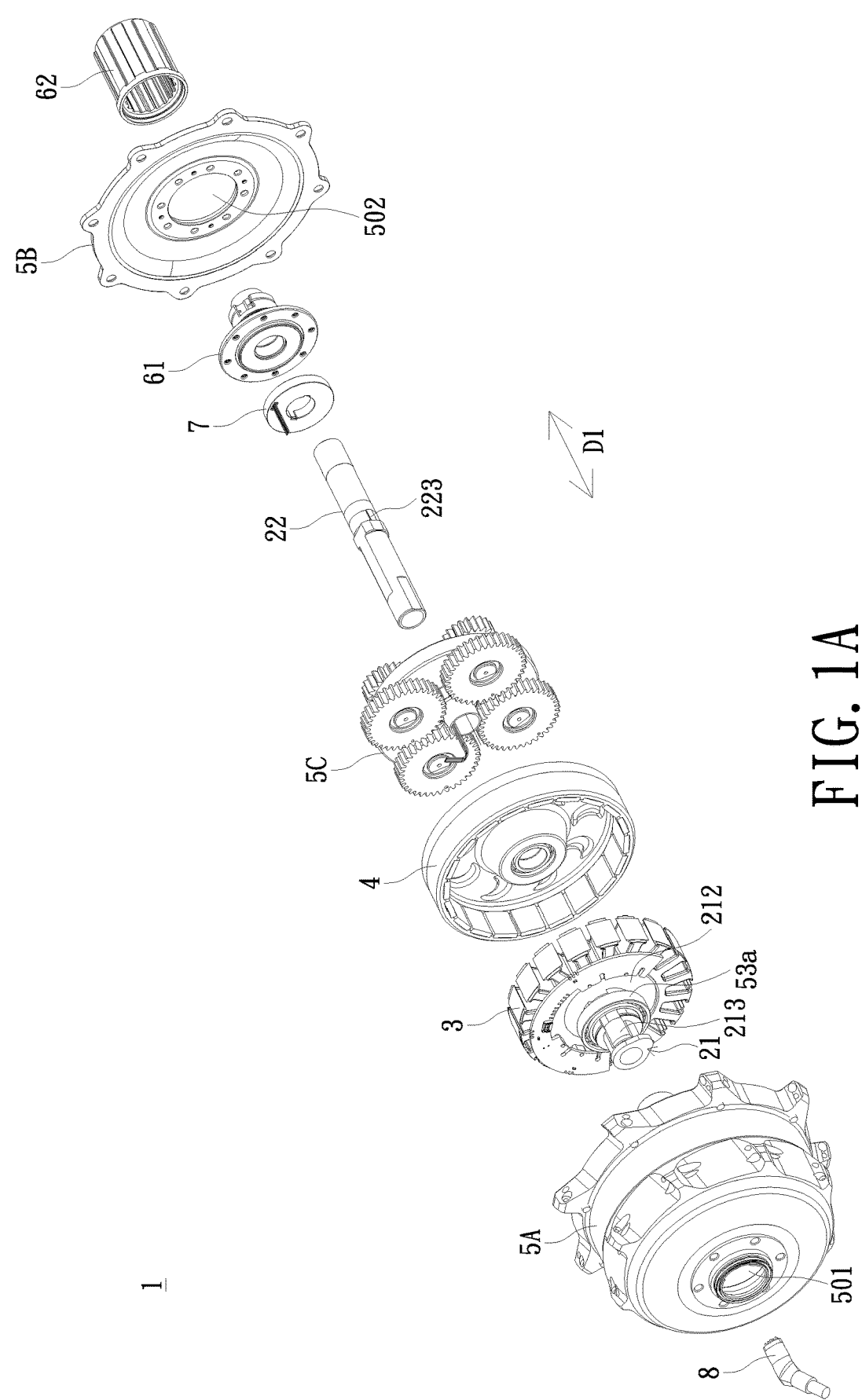
FIG. 1A is an exploded schematic diagram of a hub motor according to an embodiment of the present disclosure.

Terms used in the description of the embodiments of the present disclosure, for example, orientation or position relation such as "above" and "below" are described according to the orientation or position relation shown in the drawings. The above terms are used for facilitating the description of the present disclosure rather than limiting the present disclosure, i.e., indicating or implying that the mentioned elements have to have specific orientations and be configured in the specific orientations. In addition, terms such as "first" and "second" involved in the description or claims are merely used for naming the elements or distinguishing different embodiments or ranges rather than limiting the upper limit or lower limit of the quantity of the elements.

Figure 1B:
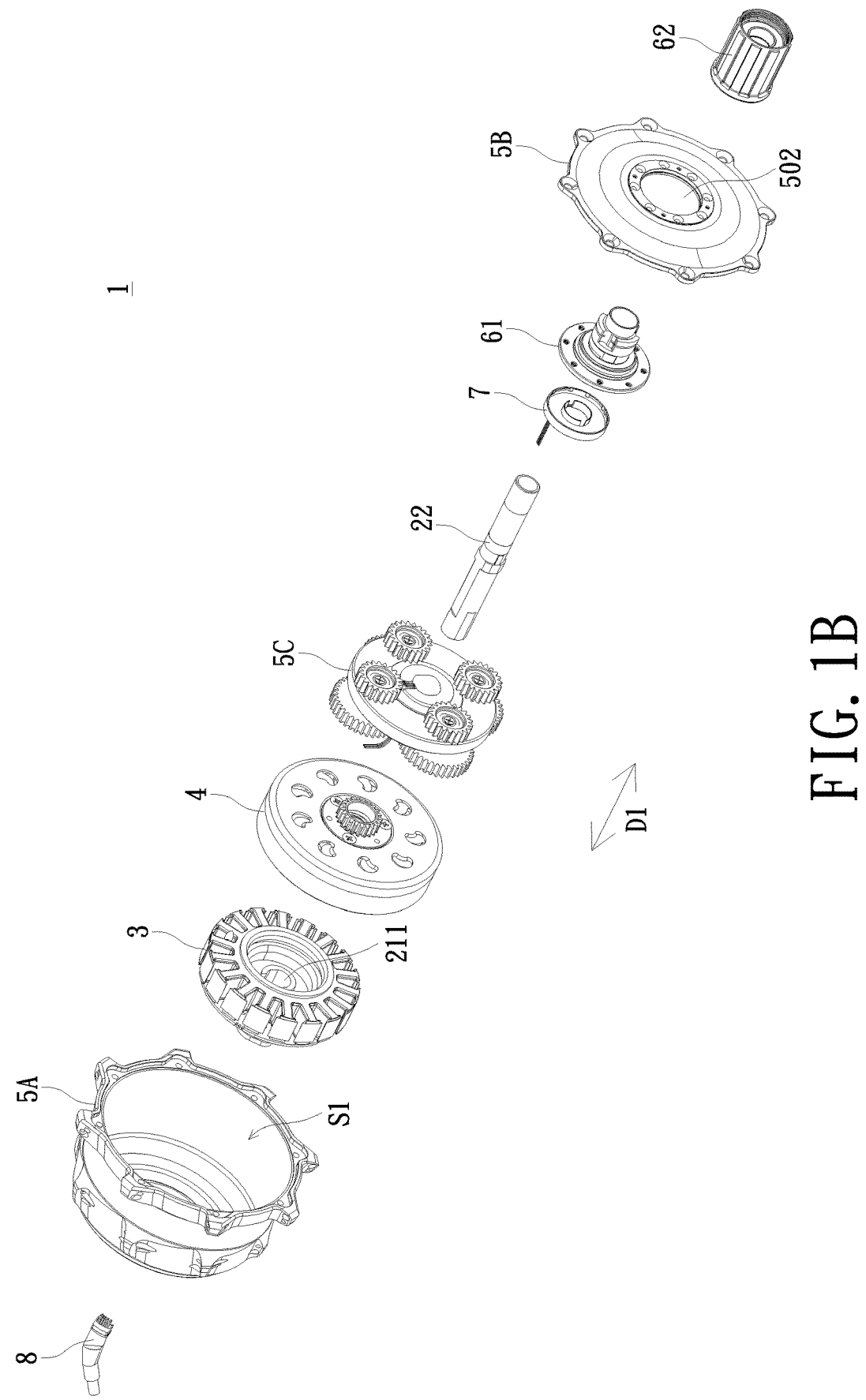
FIG. 1B is an exploded schematic diagram of the hub motor in FIG. 1A at another viewing angle.
Figure 2:
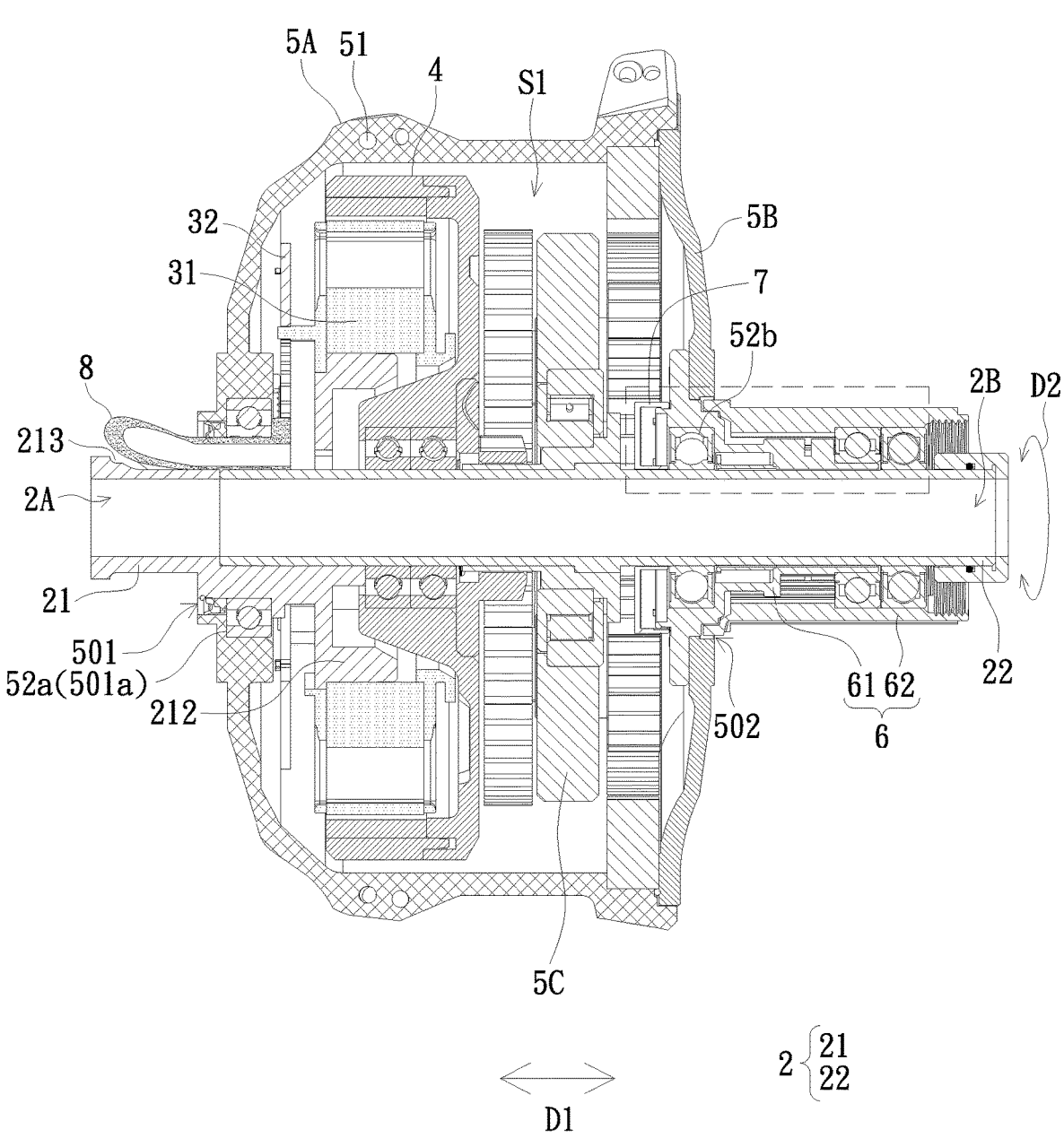
FIG. 2 is a cross-sectional schematic diagram of the hub motor in FIG. 1A.

FIG. 1A is an exploded schematic diagram of a hub motor according to an embodiment of the present disclosure. FIG. 1B is an exploded schematic diagram of the hub motor in FIG. 1A at another viewing angle. FIG. 2 is a cross-sectional schematic diagram of the hub motor in FIG. 1A. As shown in FIGS. 1A to 2, the hub motor 1 provided by this embodiment is adapted to be mounted on a bicycle (not shown) and includes an axle 2, a stator 3, a rotor 4, a casing 5, a sleeve 6, and a mounting seat 7. The axle 2 is fixed to a frame (not shown) of the bicycle and has a first end 2A, a second end 2B (see FIG. 2) opposite each other in an extension direction D1, and a bump 223 protruding out of a radial-outer-side surface of the axle 2 in a radial direction of the axle 2. The bump 223 is located on a side close to the second end 2B in the extension direction D1. The stator 3 is fixed to the axle 2 and is close to the first end 2A. The rotor 4 is sleeved on the axle 2 and pivots around the stator 3 with the axle 2 serving as an axis. The casing 5 is sleeved on the axle 2 and is adapted to be driven by the rotor 4 to be capable of pivoting with the axle 2 serving as an axis. The casing 5 has an accommodating space S1, and the accommodating space S1 is adapted to accommodate the stator 3 and the rotor 4. The sleeve 6 is rotatably sleeved on the second end 2B of the axle 2 and is fixedly connected to the casing 5. The mounting seat 7 is connected to the axle 2 and sleeved on the bump 223. The mounting seat 7 can slide in the extension direction D1 but cannot rotate in a circumferential direction D2 of the axle 2. The mounting seat 7 is adjacent to the sleeve 6 and has a sensing unit 74a (see FIG. 5) facing the sleeve 6.

Specifically, the hub motor 1 in this embodiment is, for example, mounted on the rear wheel of the bicycle. The axle 2 is, for example, fixed to the frame of the bicycle. The casing 5 is, for example, indirectly connected to a wheel frame of the rear wheel of the bicycle through a plurality of spokes connected to a plurality of holes 51 in the casing 5, thereby driving the rear wheel to rotate during rotation. The mounting position of the hub motor 1 is not limited to the rear wheel.

As shown in FIGS. 1A and 2, in this embodiment, the axle 2 is, for example, a hollow shaft body internally provided with a cavity penetrating through the interior of the axle 2 in the extension direction D1. The axle 2 includes a connecting member 21 and a central shaft member 22 which can be assembled with and disassembled from each other. One end of the connecting member 21 close to the first end 2A protrudes out of the casing 5 during assembly and is configured to be connected to the frame (not shown) of the bicycle, and the other end of the connecting member 21 is located in the accommodating space S1 of the casing 5 and is configured to be connected to the central shaft member 22 and the stator 3. One end of the central shaft member 22 is connected to the connecting member 21, and the other end of the central shaft member 22 extends out of the casing 5, is connected to the frame (not shown) of the bicycle, and is configured to support the rotor 4, a planetary gear set 5C in the casing 5, a side cover 5B of the casing 5, the mounting seat 7, and the sleeve 6.

In terms of the specific structure, as shown in FIGS. 1B to 2, in this embodiment, the end of the connecting member 21 close to the second end 2B is, for example, provided with a sleeving tube 211 configured to be connected to the central shaft member 22. A disc body 212 extends on a radial-outer-side surface of the sleeve 6 in the radial direction. The stator 3 is connected to the disc body 212.

As shown in FIGS. 1A and 2, in this embodiment, the connecting member 21 is, for example, further provided with a channel 213 extending in the extension direction D1 and recessed in a radial-outer-side surface of the connecting member 21. The channel 213 is adapted to accommodate a power line 8 and enables the power line 8 to be connected to the stator 3, located in the accommodating space S1, from the exterior of the hub motor 1 along the channel 213.

Figure 3:
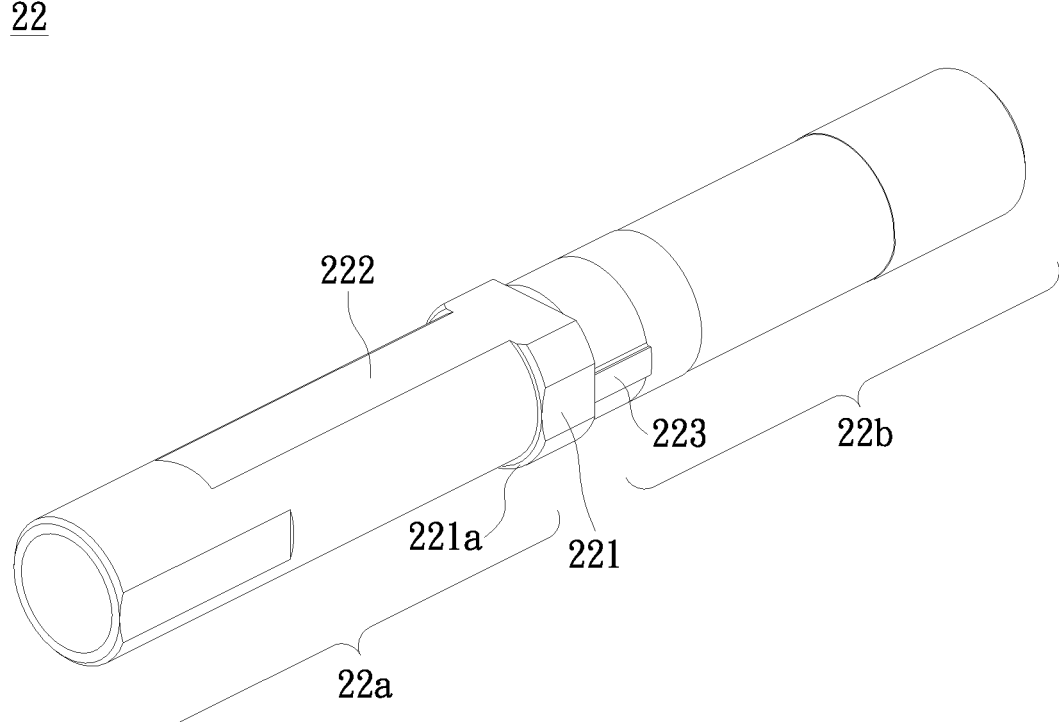
FIG. 3 is a three-dimensional schematic diagram of the central shaft member of the axle in FIG. 1A.

FIG. 3 is a three-dimensional schematic diagram of the central shaft member of the axle in FIG. 1A. As shown in FIG. 3, the central shaft member 22 of the axle 2 has, for example, a first section 22a and a second section 22b. The first section 22a is close to the first end 2A, and the second section 22b is close to the second end 2B. The radial-outer-side surface of the axle 2 is, for example, provided with a limiting block 221 extending in the radial direction between the first section 22a and the second section 22b. The bump 223 is, for example, adjacent to the limiting block 221 and extends from the limiting block 221 to the second end 2B in the extension direction D1, but is not limited to this.

The limiting block 221 may be configured to position the planetary gear set 5C, but is not limited to this. Specifically, as shown in FIG. 3, an abutting surface 221a is formed, for example, on the side of the limiting block 221 facing the first end 2A. As shown in FIG. 2, during assembly, the planetary gear set 5C is sleeved on the limiting block 221 and abuts against the abutting surface 221a of the limiting block 221 to be unable to move on the axle 2 towards the second end 2B in the extension direction D1.

Figure 4:
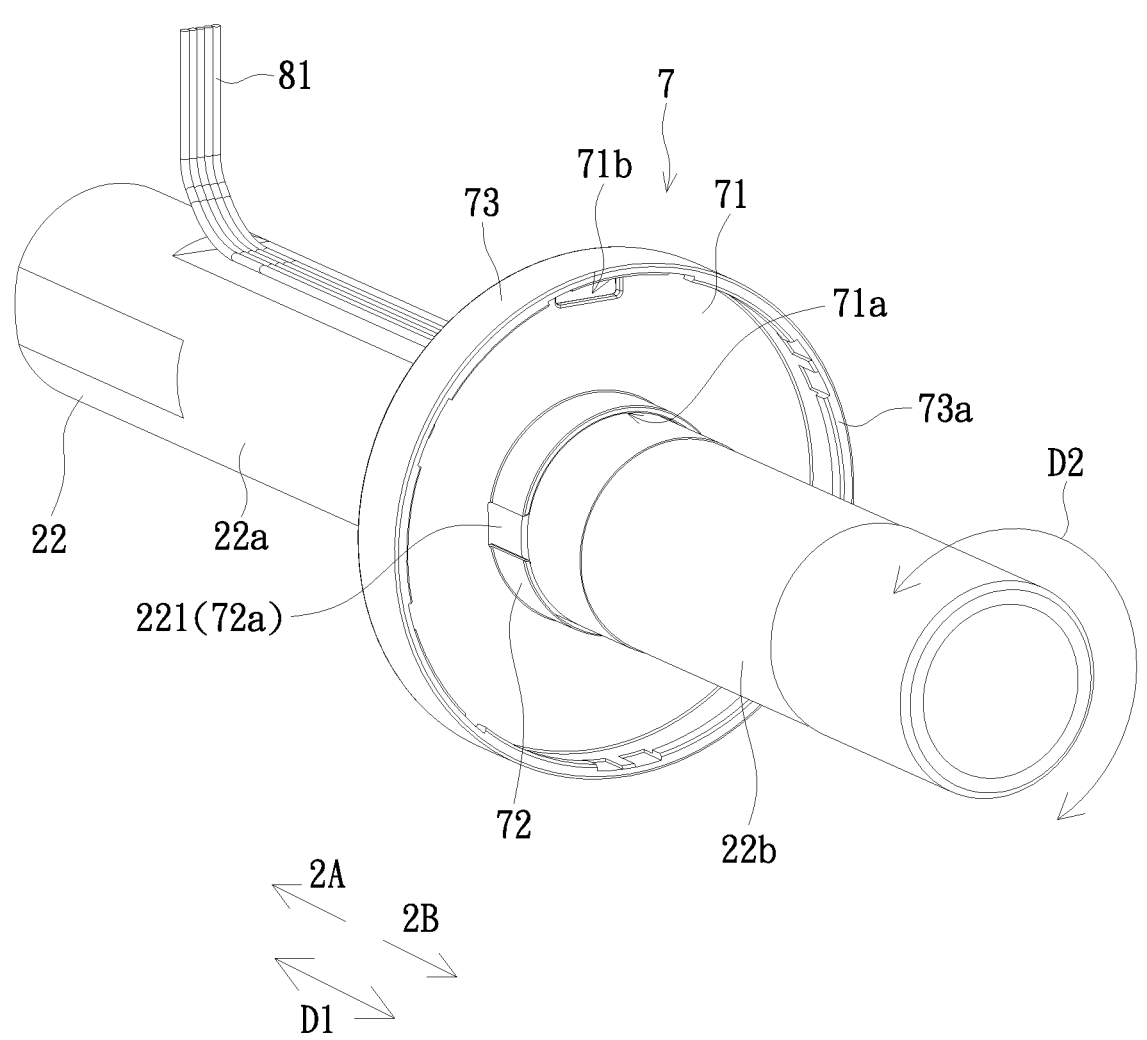
FIG. 4 is a three-dimensional schematic diagram of the central shaft member in FIG. 3 connected to the mounting seat.

FIG. 4 is a three-dimensional schematic diagram of the central shaft member 22 in FIG. 3 connected to the mounting seat 7. As shown in FIGS. 3 and 4, in this embodiment, a radially outer surface of the central shaft member 22 on one side of the first section 22a is recessed towards the axis of the axle 2 to form a wiring channel 222. The wiring channel 222 extends to the first end 2A in the extension direction D1 from the end of the limiting block 221 close to the second end 2B, and a bottom surface of the wiring channel 222 faces the radial direction facing the central shaft member 22. Thus, during assembly, a wire 81 (see FIG. 4) in the hub motor 1 may extend by means of the wiring channel 222 from the side of the planetary gear set 5C close to the first end 2A to the side close to the second end 2B. Besides, in this embodiment, the wiring channel 222 may not form a through hole, communicating a radially outer surface of the axle 2 with a radially inner surface, in the central shaft member 22, so that the central shaft member 22 may have the relatively high structural strength, but the detailed design of the wiring channel 222 is not limited to this.

As shown in FIGS. 1A and 2, in this embodiment, the stator 3 includes, for example, an electromagnet assembly 31. The electromagnet assembly 31 is, for example, sleeved on the connecting member 21 of the axle 2 and generates an electromagnetic field by means of a current provided by the power line 8 from the exterior of the hub motor 1. The magnitude of the electromagnetic field is, for example, controlled by means of a control unit 32 electrically connected to the electromagnet assembly 31, so as to change the rotation speed of the rotor 4 relative to the stator 3.

In this embodiment, the control unit 32 is, for example, connected to the electromagnet assembly 31 and located in the accommodating space S1, but is not limited to this. Specifically, in other embodiments, the control unit 32 is, for example, mounted at other positions of the bicycle (for example, a controller on a handlebar) and is, for example, electrically connected to the electromagnet assembly 31 in the accommodating space S1 by means of the power line 8 and located outside the accommodating space S1.

In this embodiment, the casing 5 includes, for example, a body 5A, a side cover 5B, and a planetary gear set 5C. The accommodating space S1 is formed in the body 5A, and the holes 51 are located on an outer surface of the body 5A. The side cover 5B is configured to cover an opening 613 (not marked due to the fact that the opening is covered) on one side of the body 5A so as to protect the assemblies such as the axle 2, the stator 3, the rotor 4, the planetary gear set 5C, and the like in the accommodating space S1. The planetary gear set 5C is connected between the casing 5 and the rotor 4 and is configured to drive the casing 5 to rotate while the rotor 4 rotates. The body 5A and the side cover 5B are respectively provided with a first through hole 501 and a second through hole 502 in correspondence with the axis of the axle 2. An arrangement groove 501a is formed around the first through hole 501, and the arrangement groove 501a is located in the accommodating space S1 and is configured to accommodate a rolling bearing 52a. The casing 5 is rotatably sleeved on the connecting member 21 by means of the rolling bearing 52a. The rolling bearing 52a is, for example, a radial bearing, but is not limited to this.

As shown in FIGS. 1A to 2 and FIG. 4, in this embodiment, the mounting seat 7 is, for example, a cover body fixed to the bump 223 and adjacent to the sleeve 6 during assembly. Specifically, the mounting seat 7 includes a disc body 212, a first convex ring 72, and a second convex ring 73.

As shown in FIG. 4, the disc body 212 has, for example, a central opening 71a and a wiring opening 71b. The central opening 71a is located in the center of the disc body 212, and a contour of the central opening 71a corresponds to shapes of the axle 2 and the bump 223. The wiring opening 71b is arranged corresponding to the wiring channel 222 in position, but is not limited to this. The first convex ring 72 is formed at a periphery of the central opening 71a, and the first convex ring 72 extends towards the sleeve 6 in the extension direction D1 and has an alignment groove 72a. The alignment groove 72a corresponds to the bump 223 in position and has an opening formed in the radial direction of the axle 2. When the mounting seat 7 is sleeved on the central shaft member 22, the wall surface of the alignment groove 72a facing the circumferential direction D2 abuts against the wall surface of the bump 223 facing the circumferential direction D2, so as to prevent the mounting seat 7 from rotating in the circumferential direction D2 of the axle 2.

As shown in FIG. 4, the second convex ring 73 is formed on an outer periphery of the disc body 212. The second convex ring 73 extends towards the sleeve 6 in the extension direction D1 and has, for example, a first buckle ring 73a located on a radial-inner-side surface of the second convex ring 73. However, the position of the first buckle ring 73a is not limited to this. The first buckle ring 73a is, for example, configured to rotatably snap-fit the mounting seat 7 on the sleeve 6 (detailed below).

The mounting seat 7 forms a first arrangement space S2, located on one side of the sleeve 6, by means of the second convex ring 73, the disc body 212, the axle 2, and the wall surface of the sleeve 6 jointly. The first arrangement space S2 internally includes, for example, a first base plate 74 provided with the sensing unit 74a. The first base plate 74 is mounted on the disc body 212, and the sensing unit 74a faces the sleeve 6. Thus, the sensing unit 74a is mounted on the mounting seat 7 that cannot rotate relative to the axle 2, and the axle 2 is fixedly connected to the frame of the bicycle so that the sensing unit 74a cannot rotate relative to the axle 2 during the movement of the hub motor 1 and has the relatively high sensing accuracy. The sensing unit 74a is, for example, a speed sensor, but is not limited to this. The above description is only an example, and the detailed shape of the mounting seat 7 is not limited to this and can be changed according to demands.

As shown in FIGS. 1A to 2, in this embodiment, the sleeve 6 is, for example, a freehub body. The sleeve 6 includes an inner tube 61 and an outer tube 62. The inner tube 61 is rotatably sleeved on the central shaft member 22 of the axle 2 by means of the rolling bearing 52b (see FIG. 5) and is fixedly connected to the casing 5 by means of the end close to the first end 2A. The outer tube 62 is configured to be connected to a cassette (not shown) of the bicycle. An inner ratchet wheel structure (not shown) is arranged between the inner tube 61 and the outer tube 62, and the inner ratchet wheel structure is adapted to enable the outer tube 62 to only drive the inner tube 61 to rotate in a movement direction and to be unable to drive the inner tube 61 to rotate when rotating in the direction opposite to the movement direction. Thus, when pedaling, a user can drive the cassette by means of a chain (not shown) of the bicycle and then drive the freehub body and the casing 5 to rotate.

Figure 5:
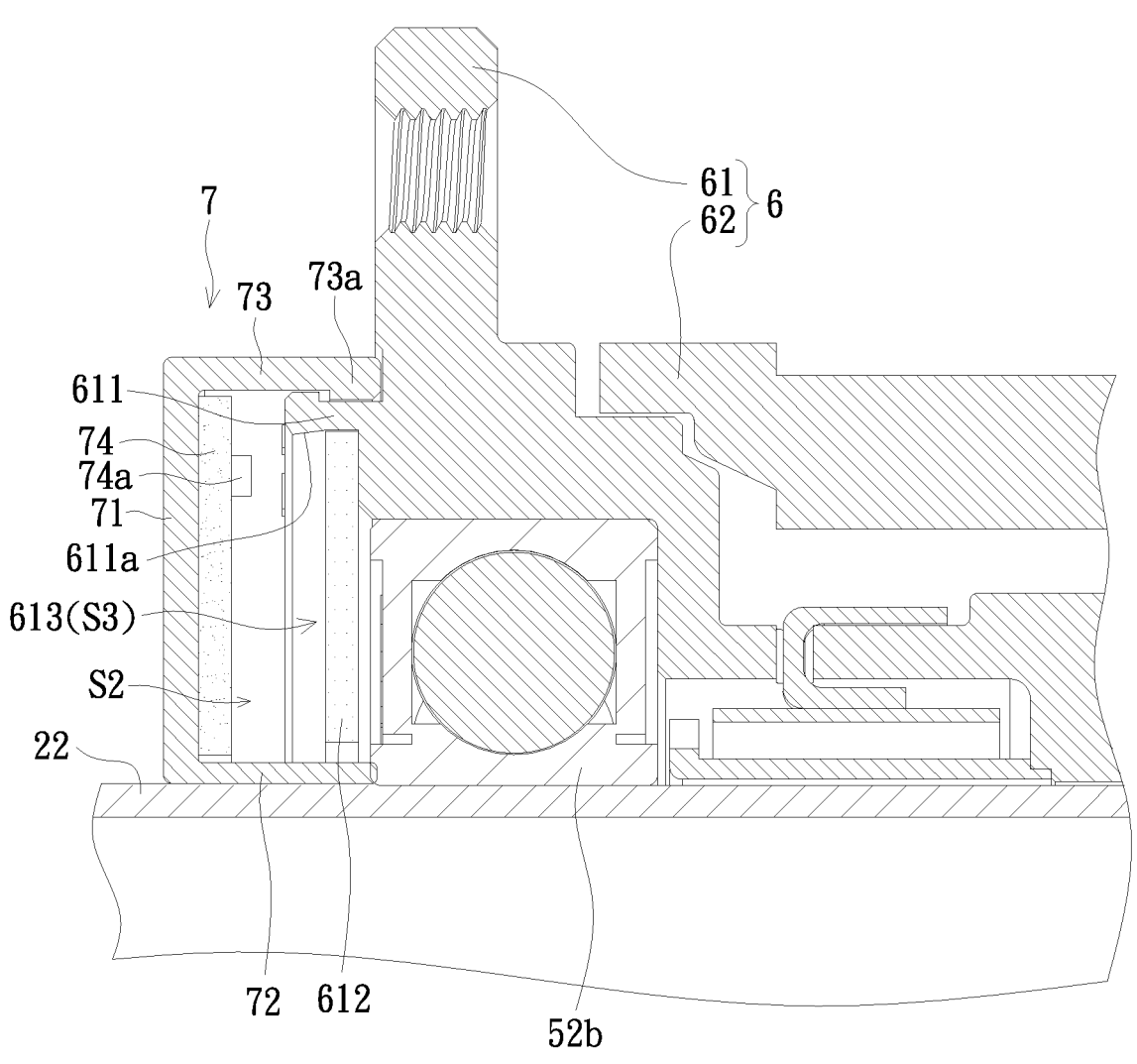
FIG. 5 is a local cross-sectional schematic diagram of a junction of the central shaft member, the sleeve, and the mounting seat.

FIG. 5 is a local cross-sectional schematic diagram of a junction of the central shaft member, the sleeve, and the mounting seat. As shown in FIGS. 1A and 5, in this embodiment, the side (located in the accommodating space S1) of the inner tube 61 close to the first end 2A has a third convex ring 611 extending towards the first end 2A in the extension direction D1. A second arrangement space S3 is enclosed by a radial-inner-side surface of the third convex ring 611. As shown in FIG. 5, the second arrangement space S3 is located in the first arrangement space S2, and the second arrangement space S3 is configured to arrange and accommodate a second base plate 612 facing the sensing unit 74a. The second base plate 612 is, for example, an annular plate body, but is not limited to this.

In this embodiment, the radial-inner-side surface of the third convex ring 611 is, for example, a polygon. Thus, as shown in FIG. 5, on sections of the third convex ring 611 at some angles around the axle 2, the size of the opening 613 enclosed by the third convex ring 611 is less than the outer diameter of the second base plate 612, and the inner diameter of the third convex ring 611 gradually shrinks from the second end 2B to the first end 2A (as shown in FIG. 5). On sections at other angles, the size of the opening 613 enclosed by the third convex ring 611 is equal to or greater than the size of the second base plate 612, and the inner diameter of the third convex ring 611 does not gradually shrink from the second end 2B to the first end 2A (not shown). Thus, the sizes of part of the edges of the second base plate 612 are greater than that of the opening 613, the second base plate 612 can be snap-fitted in the third convex ring 611 by means of the material elasticity of the third convex ring 611 during assembly, but the detailed mounting manner is not limited to this. In addition, as shown in FIG. 5, in this embodiment, the end of the first convex ring 72 of the mounting seat 7 that is away from the disc body 212 is, for example, close to the rolling bearing 52*b* during assembly, and the end (inner ring surface) of the second base plate 612 close to the first convex ring 72 abuts against an inner side surface of the first convex ring 72, but is not limited to this.

Figure 6:
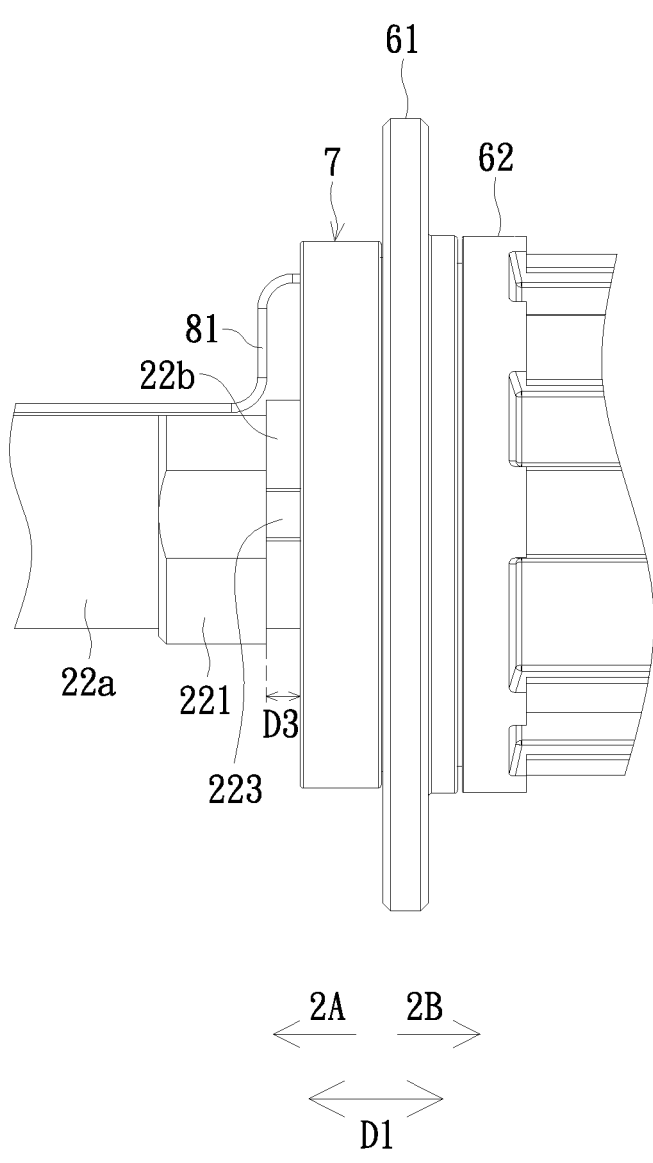
FIG. 6 is a combined schematic diagram of the central shaft member, the sleeve, and the mounting seat in the embodiment as shown in FIG. 1A.

FIG. 6 is a combined schematic diagram of the central shaft member, the sleeve, and the mounting seat in the embodiment as shown in FIG. 1A. As shown in FIGS. 5 and 6, in this embodiment, a second buckle ring 611*a* is arranged on a radial-outer-side surface (outer surface) of the third convex ring 611. The second buckle ring 611*a* is slidably snap-fitted with the first buckle ring 73*a*. As shown in FIG. 6, by means of such a structure, during assembly, the sleeve 6 may be snap-fitted on the mounting seat 7 and rotate relative to the mounting seat 7. During snap-fitting, a gap D3 is formed between the mounting seat 7 and the limiting block 221.

By means of the above-mentioned structure, in this embodiment, the first base plate 74 and the sensing unit 74*a* are arranged opposite the second base plate 612, and other assemblies may be arranged on the second base plate 612. For example, in some embodiments not shown, a sensed assembly corresponding to the sensing unit 74*a* may be arranged on the second base plate 612, thereby improving the accuracy of the sensing unit 74*a*. In other embodiments, the second base plate 612 and the first base plate 74 may be respectively provided with induction coil groups, and other electronic assemblies on the second base plate 612 may obtain a current, provided by the first base plate 74, by means of the induction coil groups without relying on wires. However, related assemblies of the electronic assemblies on the first base plate 74 and the second base plate 612 are not limited to this.

Besides, as shown in FIG. 5, the first base plate 74 and the second base plate 612 in the hub motor 1 are located in the first arrangement space S2 and are surrounded by the sleeve 6 and the mounting seat 7, so that the base plates can be prevented from being polluted by the external environment, and the electronic assemblies such as the sensing unit 74*a* and the like can be prevented from being affected and have the relatively high sensing accuracy.

According to the above description, with regard to the hub motor of the present disclosure, the sensing unit is mounted on the mounting seat fixed to the axle, and the mounting seat is snap-fitted with the axle by means of the bump of the axle so that the hub motor has the advantage of quickness in assembly and positioning; and the mounting seat is away from the stator and the rotor, so that the sensing unit on the mounting seat may have the relatively high accuracy due to the fact that the influence caused by electromagnetic fields of the stator and the rotor is reduced due to the fact that the sensing unit is away from the stator and the rotor.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hub motor adapted to be mounted on a bicycle, the hub motor comprising:

an axle, fixed to a frame of the bicycle and having a first end, a second end, and a bump, wherein the first end and the second end are opposite each other in an extension direction, the bump protrudes out of a radial-outer-side surface of the axle in a radial direction of the axle, and the bump is located on a side close to the second end in the extension direction;

a stator, fixed to the axle and close to the first end;

a rotor, sleeved on the axle and pivoting around the stator with the axle as an axis;

a casing, sleeved on the axle and driven by the rotor to pivot with the axle as an axis, wherein the casing has an accommodating space, and the accommodating space accommodates the stator and the rotor;

a sleeve, rotatably sleeved on the second end of the axle and fixedly connected to the casing; and a mounting seat, connected to the axle and sleeved on the bump, wherein the mounting seat is configured to slide in the extension direction and is configured to not rotate in a circumferential direction of the axle, and the mounting seat is adjacent to the sleeve and has a sensing unit facing the sleeve.

2. The hub motor according to claim 1, wherein the mounting seat has a disc body, the disc body has a central opening, and a contour of the central opening corresponds to shapes of the axle and the bump.

3. The hub motor according to claim 2, wherein a first convex ring extending towards the sleeve in the extension direction is formed at a periphery of the central opening, and the first convex ring has an alignment groove corresponding to the bump in position and facing the radial direction.

4. The hub motor according to claim 2, wherein a second convex ring extending towards the sleeve in the extension direction is formed at an outer periphery of the disc body, the second convex ring, the disc body, the axle, and the sleeve jointly form a first arrangement space located on one side of the sleeve, and the sensing unit is disposed in the first arrangement space.

5. The hub motor according to claim 4, wherein the sleeve has a third convex ring extending towards the first end in the extension direction, the second convex ring has a first buckle ring located on a radial-inner-side surface of the second convex ring, and the first buckle ring is rotatably snap-fitted with the third convex ring.

6. The hub motor according to claim 5, wherein an inner diameter of the third convex ring gradually shrinks from the second end to the first end, a second arrangement space is enclosed by a radial-inner-side surface of the third convex ring, and a base plate facing the sensing unit is arranged in the second arrangement space.

7. The hub motor according to claim 6, wherein the third convex ring has an opening facing the mounting seat, and the base plate has a size greater than that of the opening.

8. The hub motor according to claim 5, wherein an inner diameter of the third convex ring gradually shrinks from the second end to the first end, a second buckle ring is arranged on an outer surface of the third convex ring, and the second buckle ring is slidably snap-fitted with the first buckle ring.

9. The hub motor according to claim 1, wherein the radial-outer-side surface of the axle has a wiring channel facing the radial direction and extending in the extension direction, and the mounting seat has a wiring opening corresponding to the wiring channel in position.

10. The hub motor according to claim 1, wherein the radial-outer-side surface of the axle has a limiting block extending in the radial direction, and the limiting block is adjacent to the bump.

* * * * *